Feb. 5, 1935. F. P. MILLER Re. 19,450

REAMER

Original Filed Sept. 30, 1921

INVENTOR
FRANK P. MILLER
BY
Attorney

Reissued Feb. 5, 1935

Re. 19,450

UNITED STATES PATENT OFFICE 19,450

REAMER

Frank P. Miller, Meadville, Pa.

Original No. 1,431,831, dated October 10, 1922, Serial No. 504,319, September 30, 1921. Application for reissue July 20, 1934, Serial No. 736,276

5 Claims. (Cl. 77—75.5)

This invention relates to inserted blade rotary cutters for use in connection with metal.

Briefly stated, the invention looks to the provision of an inserted blade rotary cutter in which the distribution of material forming the peripheral portion of the carrier serves the triple purpose of (1) providing firm backing for the blades, particularly behind the cutting leads thereof; (2) providing chip clearance recesses located radially inward of the said cutting leads, and enlarging toward the leading sides of the blades; and (3) locating the walls of the chip clearance recesses longitudinally in advance of the blade locking means and in converging relation to the pin receiving grooves thereof so that such walls are caused to serve as guides directing into final position the pins of the blade locking means to facilitate assembly and adjustment.

It will be found that while the chip clearance recesses enlarge as the same approach the leading sides of the blades there is, nevertheless, ample support for the blade locking pins and screws immediately rearward thereof with the result that the locking pins and screws are permitted to function to the greatest advantage in forcing the blades laterally and inward to seated position.

By way of further brief preliminary reference to the chip clearance recesses, it will be found that the rear walls of such recesses extend obliquely with reference to the longitudinal axis of the tool and, at the same time, are inclined rearward as the same approach the periphery of the body to assist in curling chips easily and naturally away from the blades and the body material and thus, avoid damage to these parts.

In the accompanying drawing forming a part of this application and in which like numerals are employed to designate like parts throughout the same, Figure 1 is a fragmentary side elevation of a rotary cutter embodying the invention.

Figure 1:
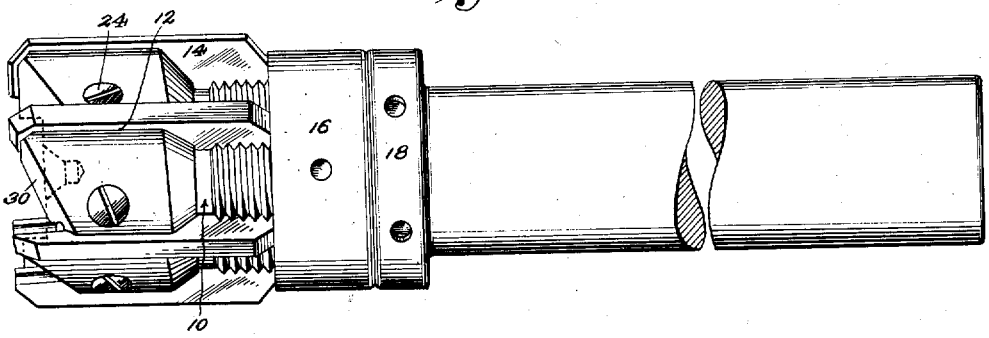

In the drawing and particularly Figures 1 to 4 inclusive, the numeral 10 generally designates a blade carrier or body formed with an annular series of circumferentially spaced slots 12, opening out through the periphery and forward end thereof for the detachable and adjustable reception of cutting blades 14.

As in the case of my Patent No. 1,244,227, issued October 23, 1917, the blade engaging bottom walls of the slots 12 are inclined outward with reference to the longitudinal axis of the tool in the direction of the forward end of the tool so that forward movement of the blades has the effect of increasing the cutting diameter of the tool. A thrust collar 16 is shown to be threaded upon the body for engagement with the rear portions of the blade and thereby provides simultaneous and co-extensive adjustment of the blades. The thrust collar 16 is, in turn, engaged by a locking ring 18 also threaded upon the body.

Figure 2:
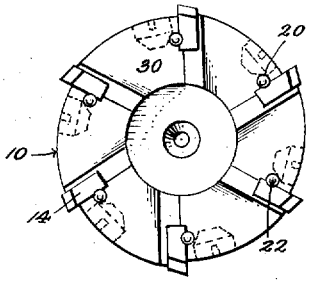
Figure 2 is an end elevation of the tool.
Figure 3:
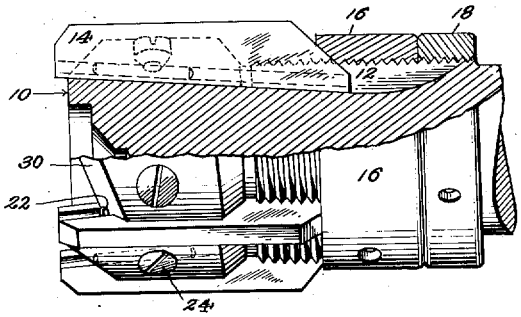
Figure 3 is a detail longitudinal sectional view through the tool.

Referring now to Figures 2 and 3, it will be seen that the leading side walls of the blades and the slots 12 are provided with opposed complemental grooves 20 for the reception of locking pins 22, such locking pins being engaged by locking screws 24. It is believed to be clear that the locking screws 24 act through the pins 20 in forcing the blades laterally into firm pressure contact with the back or rear side walls of the slots. At the same time, the screws 24 act through the pins 20 in forcing the blades inward into firm seating contact with the bottom walls of the slots.

The formation of the carrier with an annular series of slots defines, in effect, an annular series of intervening peripheral segmental blade supporting portions or sections which are proportioned to increase in radial dimension as the same approach the back sides of the blades. In fact, the intervening segmental peripheral portions or sections of the carrier extend to points adjacent the outer longitudinal edges of the backs of the blades and thus provide generous support for the blades against the lateral thrust due to the operation of the tool.

More particularly, the outer surfaces of the segmental blade supporting portions recede from the back walls of the blades adjacent the outer longitudinal edges thereof to points well inward of the outer longitudinal edges of the leading sides of the succeeding or following blades.

In tools of this character, the outer longitudinal edges of the blades are provided at the leading and forward corner portions thereof with longitudinally extending cutting leads for cutting engagement with the work.

Now, it will be seen that the forward terminals of the segmental peripheral portions of the carrier recede circumferentially from points adjacent the forward terminals of the trailing sides of the blades to points substantially rearward of the forward terminals of the leading sides of the blades. This provides maximum backing for the blades, particularly, behind the longitudinally extending cutting leads thereof, and in addition, provides chip clearances 30 located radially inward of the cutting leads of the blades and circumferentially in advance thereof. In other words, the oblique forward terminals of the segmental peripheral portions cooperate with the leading sides of the blades in forming chip clearance recesses 30.

The back walls of the chip clearance recesses 30 are not only inclined rearward as the same approach the leading sides of the blades but, at the same time, such walls are inclined backward as the same approach the periphery of the carrier to assist in curling the chips easily and naturally away from the blades and the body material, and thus, avoid damage to these parts.

It is important to observe that the walls of the chip clearance recesses 30 definitely converge toward the complemental grooves 20 and thus serve as guides directing the pins 22 into such grooves. Thus, it may be said that the chip clearance recesses 30 break into the complemental pin receiving grooves 20 in a manner which looks to the easy introduction of the pins 22 and the convenient securing in place of the blades.

Also, the chip clearance recesses and the distribution of metal forming the peripherally located segmental blade supporting portions provide for the firm and ample support of the elements 22 and 24 at the leading sides of the blades.

The angle of the bottom or back wall of each chip clearance recess 30 with respect to the associated blade, and more particularly to the cutting portion thereof, is such that the chips from that blade are caused to curl easily and naturally away from the carrier and the blade without interference by the carrier and without the possibility of damage to either the carrier or blades.

Figure 4:
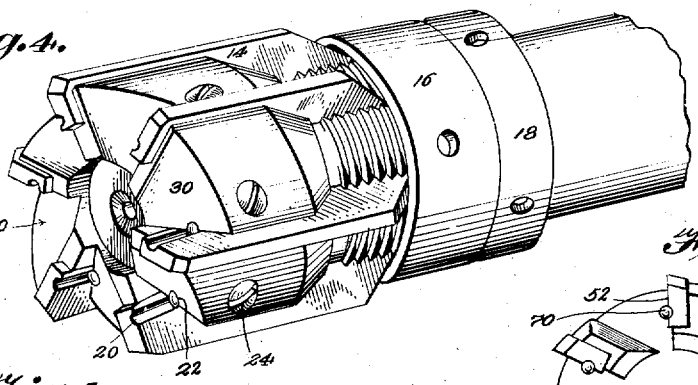
Figure 4 is a fragmentary perspective of the tool.

Further, the provision of the chip clearance recesses 30 shortens those portions of the carrier grooved for the accommodation of the pins 22 and this makes possible the employment of a shorter pin. The shorter the pin, the stiffer it is longitudinally, and yet the pin must be long enough to fill its recess clear to the front end of the carrier. This is necessary to keep chips and dirt from lodging in such recess. Also, it is highly advantageous that the locking screw for each pin be approximately opposite the longitudinal center of the blade to support such blade as uniformly as possible throughout its entire length. The presence of the chip clearance recesses 30, as shown in Figure 4, achieves this highly advantageous result and, more specifically, makes it possible to keep the screw in the proper position approximately midway of the ends of the blade without using a pin so long as to be undesirably flexible and, therefore, not stiff enough to properly support the blade.

In summarizing, it will be seen that the invention is in the nature of a substantially cylindrical body provided with spaced slots defining intervening blade supporting sections and that blades are mounted in the slots and are provided with leading and trailing sides and with cutting leads, the longitudinally forward portion of each blade supporting section being in backing engagement with the preceding blade at a point adjacent to the forward end of the outer longitudinal edge thereof and receding progressively both radially and axially up to the leading side of the succeeding blade so as to define a compound relief surface radially inward of each cutting lead and forming a chip clearance recess in which the maximum radial and axial dimensions are in advance of the cutting lead of the blade and giving each blade supporting section a short side in advance of the leading side of the succeeding blade and a long side at the trailing side of each blade. Further, it will be seen that a locking pin 22 is carried by the short side of each blade supporting section and has the forward terminal thereof approximately flush with the associated compound relief surface and substantially rearward of the blade backing portion of the associated blade supporting section, there being fastening means for each pin.

In continuing the summary of the invention, it is pointed out that the peripheral surface of each blade supporting section is relieved eccentrically up to the leading side of the succeeding blade to form a second series of chip clearance recesses deepening up to the points where the same meet the blades and communicating at the deepest portions thereof with the deepest portions of the first-named chip clearance recesses.

Figure 6:
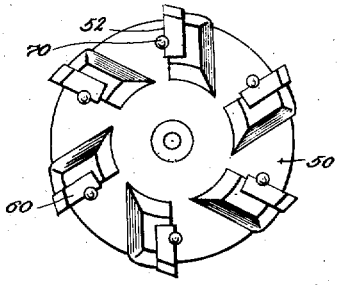
Figure 6 is an end elevation of the tool shown in Figure 5.
Figure 5:
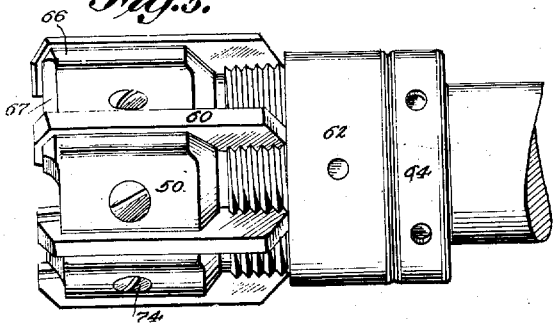
Figure 5 is a fragmentary side elevation of a modified form of tool.

In the form of invention disclosed in Figures 5 and 6, the cutter body or carrier is designated by the numeral 50 and is provided with an annular series of circumferentially spaced slots 52, opening out through the periphery and forward end of the body for the reception of an annular series of blades 60, the rear portions of the blades being engaged by a thrust collar 62.

It is clearly shown in Figure 5 that the thrust collar 62 is threaded upon the body 50 and provides a simple means by which the blades are held against rearward shifting and by which the blades may be adjusted simultaneously and co-extensively. It is also illustrated in Figure 5 that a locking collar 64 is threaded upon the body 50 rearwardly of the thrust collar 62 for engagement with the thrust collar 62 for the obvious purpose of locking the same firmly in place.

Of course, as in the case of the cutter shown in Figures 1 to 4, it is the outer longitudinal edge portions of the blades 60 that are sharpened at the leading corners thereof for cutting engagement with the work and it will be seen that the portions of metal between the several blades 60 are raised at the trailing or back sides of the blades to provide axially extending supporting ribs 66 engaging and bracing the blades for the major portions thereof against the lateral thrust of the cuts.

It is further illustrated in Figures 5 and 6 that the longitudinally extending ribs 66 project forwardly beyond the major portion of the metal forming the body or carrier 50 to points flush with the outer surfaces of radial ribs 67 to cooperate therewith in backing up the blades, particularly in the region of the cutting leads thereof, at which points, the blades are called upon to bear the greatest lateral strain.

From Figure 6, it will be seen that the ribs 67 are more or less L-shaped in formation and extend somewhat radially, with what might be said to be the inside surfaces thereof in definite bracing engagement with the inner edges and back sides of the blades.

The projection of the ribs 66 and 67 beyond the major portion of the carrier body defines chip clearance recesses between these ribs and the leading sides of the blades. As in the case of the cutter shown in Figures 1 to 4, the chip clearance recesses are positioned radially inward of the longitudinally extending cutting leads on the outer edges of the blades and at the same time, are circumferentially in advance thereof so as to provide for the expeditious clearance of chips.

The leading side walls of the blades 60 and the opposed side walls of the slots 52 are formed with complemental grooves detachably receiving locking pins 70 which, of course, are engaged by locking screws 74, it being clear that the locking screws force the pins laterally and inward so as to bring about the firm engagement of the blades with the back walls of the associated slots, and at the same time, force the blades radially inward into firm pressure engagement with the seats thereof.

Having thus described the invention, what is claimed is:

1. In a reamer, a substantially cylindrical body provided with spaced slots defining intervening blade supporting sections, blades in said slots and provided with leading and trailing sides and cutting leads, the longitudinally forward portion of each blade supporting section being in backing engagement with the preceding blade at a point approaching the forward end and outer longitudinal edge thereof and receding both radially and axially up to the leading side of the succeeding blade to define a compound relief surface radially inward of each cutting lead and forming a chip clearance recess of maximum radial and axial dimensions in advance of each cutting lead and giving each blade supporting section a short side in advance of the leading side of the succeeding blade and a long side at the trailing side of each blade, a blade locking pin carried by the said short side of each blade supporting section and having the forward terminal thereof approximately flush with the associated compound relief surface and substantially rearward of the blade backing portion of the associated blade supporting section, and a pressure medium carried by each blade supporting section and engaging the intermediate portion of the associated pin.

2. In a reamer, a substantially cylindrical body provided with spaced slots defining intervening blade supporting sections, blades in said slots and provided with leading and trailing sides and cutting leads, the longitudinally forward portion of each blade supporting section being in backing engagement with the preceding blade at a point approaching the forward end and outer longitudinal edge thereof and receding both radially and axially up to the leading side of the succeeding blade to define a compound relief surface radially inward of each cutting lead and forming a chip clearance recess of maximum radial and axial dimensions in advance of the cutting lead and giving to each blade supporting section a short side in advance of the leading side of the succeeding blade and a long side at the trailing side of each blade, a blade locking pin carried by the said short side of each blade supporting section and having the forward terminal thereof approximately flush with the associated compound relief surface and substantially rearward of the blade backing portion of the associated blade supporting section, and a pressure medium engaging the intermediate portion of said pin to urge the same into pressure contact with the adjacent blade, the peripheral surface of each blade supporting section being relieved eccentrically up to the leading side of the succeeding blade to form a second series of chip clearance recesses deepening up to the points where the same meet the blades and communicating at the deepest portions thereof with the deepest portions of said first-named chip clearance recesses.

3. In a reamer, a substantially cylindrical body provided with spaced slots defining intervening blade supporting sections, blades in said slots and provided with leading and trailing sides and cutting leads, the longitudinally forward portion of each blade supporting section being in backing engagement with the preceding blade at a point approaching the forward end and outer longitudinal edge thereof and receding both radially and axially up to the leading side of the succeeding blade to define a compound relief surface radially inward of each cutting lead and forming a chip clearance recess of maximum radial and axial dimensions in advance of each cutting lead and giving each blade supporting section a short side in advance of the leading side of the succeeding blade and a long side at the trailing side of each blade, a blade locking pin carried by the said short side of each blade supporting section and having the forward terminal thereof approximately flush with the associated compound relief surface and substantially rearward of the blade backing portion of the associated blade supporting section, and a pressure medium engaging the intermediate portion of each pin to force the pin into locking engagement with the associated blade, the said short side of each blade supporting section being radially inward and immediately in advance of the succeeding blade to form a second set of chip clearance recesses communicating with the deepest portions of the said first-named chip clearance recesses.

4. In a reamer, a substantially cylindrical body having circumferentially spaced slots opening out through the periphery and forward end thereof and defining intervening blade supporting sections, blades adjustable in said slots and having leading and trailing sides and cutting leads, each section of the body being formed with two complemental chip clearances, one longitudinally along the leading side of the succeeding blade and the other diagonally across the forward end of the blade supporting section in front of and radially inward of the cutting lead of the succeeding blade, each diagonal chip clearance being gradually deepened as it approaches the succeeding blade and having communication with the longitudinal chip clearance to assist in the free movement of chips away from the adjacent cutting lead, a blade locking pin carried by each blade supporting section and having the forward terminal thereof approximately flush with the surface of the associated diagonal chip clearance and rearward of the extreme forward portion of the body, and a binding screw engaging the intermediate portion of each blade locking pin to force the same into pressure engagement with the blade and thus lock the blade in position in the associated slot.

5. In a reamer, a substantially cylindrical body having circumferentially spaced slots opening out through the periphery and forward end thereof and defining intervening blade supporting sections, blades adjustable in said slots and having leading and trailing sides and cutting leads, each section of the body being formed with two complemental chip clearances, one longitudinally along the leading side of the succeeding blade and the other diagonally across the forward end of the blade supporting section in front of and radially inward of the cutting lead of the succeeding blade, each diagonal chip clearance being gradually deepened as it approaches the succeeding blade and having communication at the point of greatest depth with the longitudinal chip clearance to assist in the free movement of chips away from the adjacent cutting lead, a blade locking pin carried by each blade supporting section and having the forward terminal thereof approximately flush with the surface of the associated diagonal chip clearance and rearward of the extreme forward portion of the body, and a binding screw engaging the intermediate portion of each blade locking pin to force the same into pressure engagement with the blade and thus lock the blade in position in the associated slot.

FRANK P. MILLER.